United States Patent Office 2,787,500
Patented Apr. 2, 1957

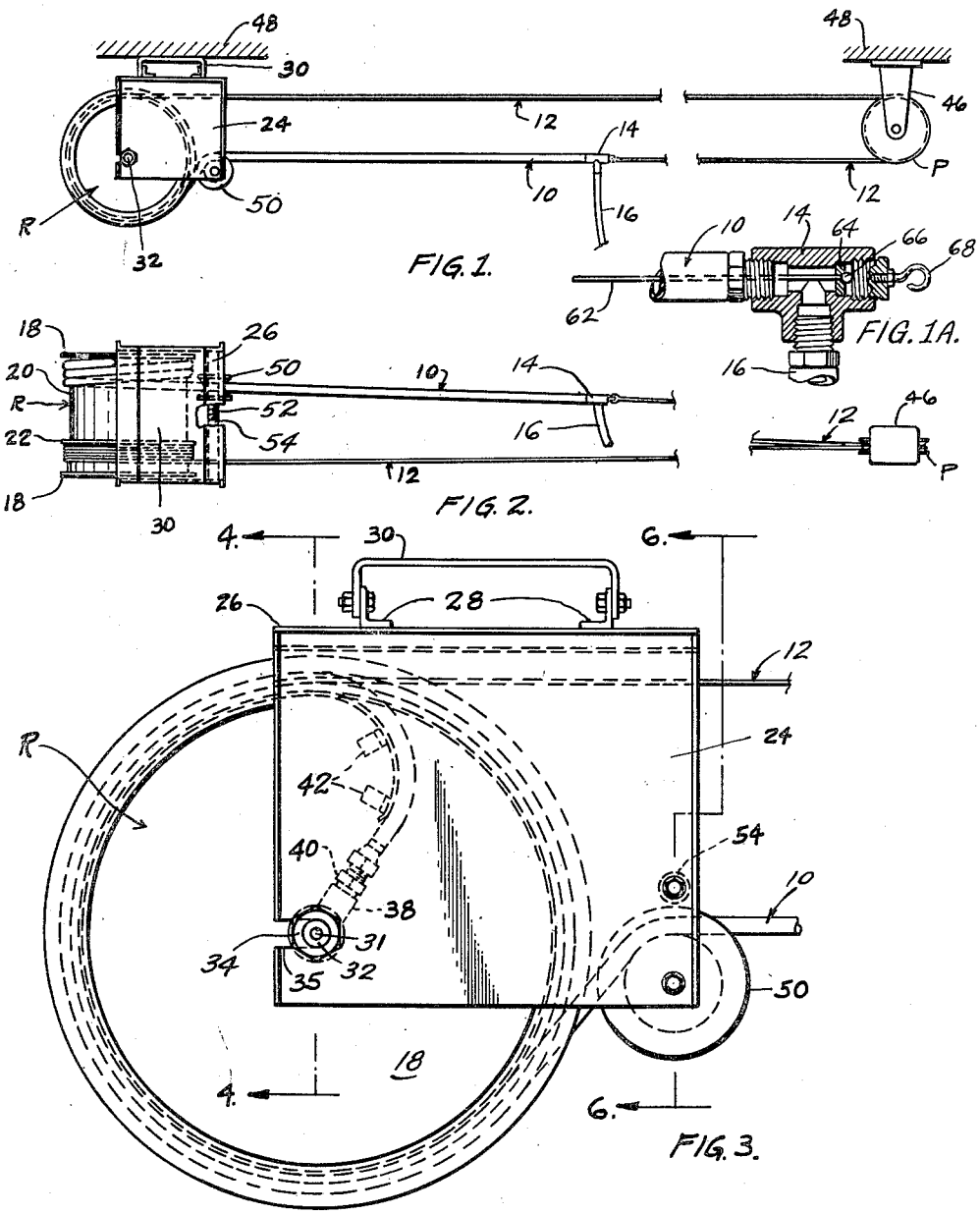

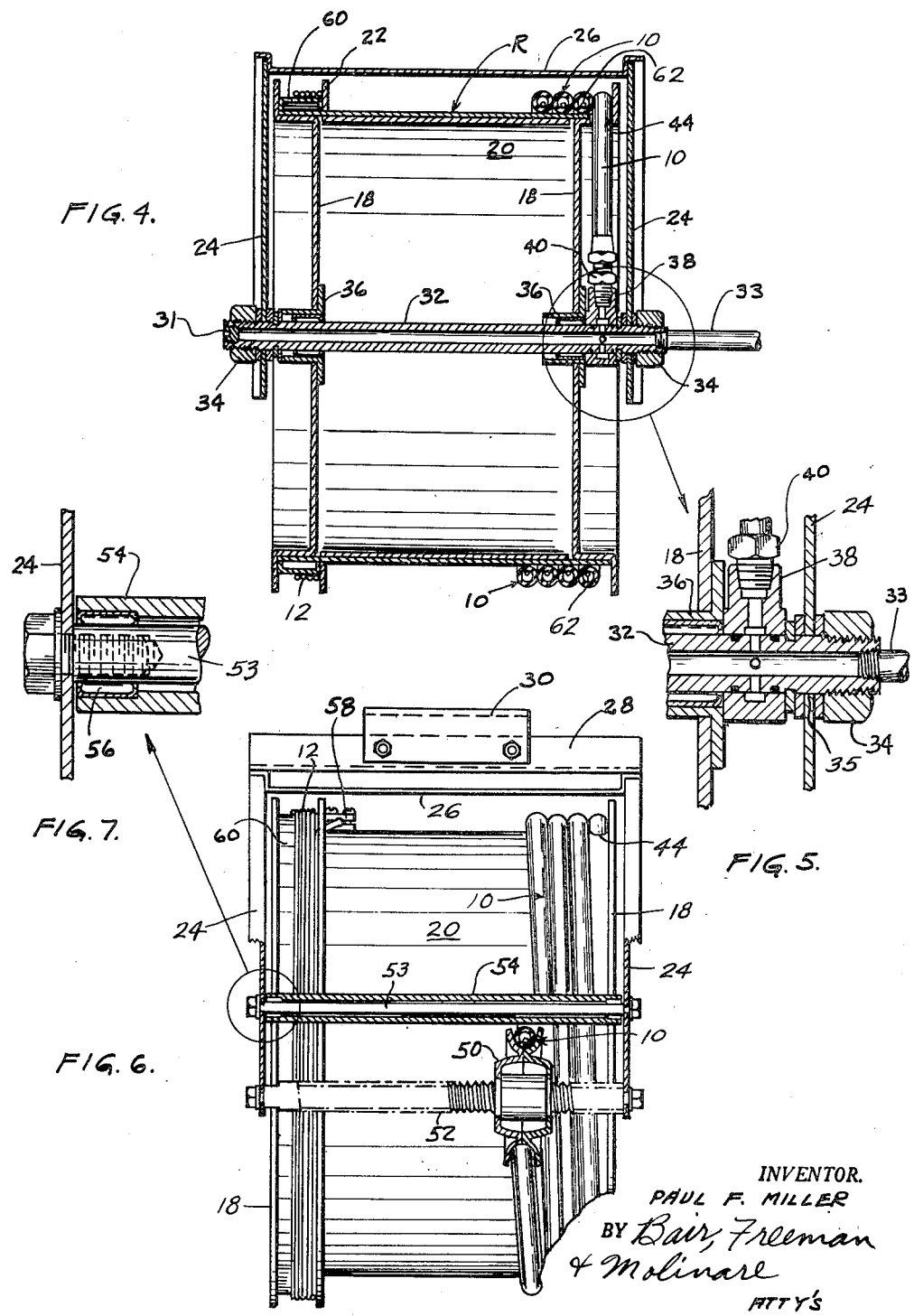

2,787,500

HOSE REEL WITH TRAVERSING OUTLET

Paul F. Miller, Bryan, Ohio, assignor to The Aro Equipment Corporation, Bryan, Ohio, a corporation of Ohio Application January 23, 1956, Serial No. 560,758

16 Claims. (Cl. 299—78)

This invention relates to a hose reel having a traversing outlet, that is, one which may traverse between two spaced points.

One object of the invention is to provide a traversing outlet hose, and a supporting reel and pulley arrangement therefor to permit of such traversing, so that the hose outlet may be moved to different points along the path of traversal. In this connection a hose for supplying lubricant or other material to different bearings of an automobile or machine may be arranged according to my invention so that the outlet nozzle can be positioned at different points along an automobile or the like, or when the hose carries compressed air or the like, a pneumatic tool located at the hose outlet may be used anywhere along an assembly bench, an assembly conveyor or the like.

Another object is to provide a combined hose and cable reel, and an arrangement of a hose member and a cable member such that one member is wound on the reel while the other member is unwound therefrom, the outer ends of the hose and cable being provided with a connector for connecting said ends together, and the cable extending over a pulley remote from the reel so that the connector may traverse between the reel and the pulley.

A further object is to provide a rotatable sealed connection between a shaft of the reel and the hose wound on the reel to carry material such as lubricant, compressed air or the like from a stationary supply to the hose as it rotates with the reel.

Still a further object is to provide a guide pulley for the hose as it is unwound from and rewound on the reel.

An additional object is to provide an arrangement whereby the guide pulley is mounted on a threaded shaft so as to properly rewind the hose on the reel.

With these and other objects in view, my invention consists in the construction, arrangement and combination of the various parts of my hose reel with traversing outlet, whereby the objects above contemplated are attained, as hereinafter more fully set forth, pointed out in my claims and illustrated in detail on the accompanying drawings, wherein:

Fig. 1 is a side view of a hose reel with traversing outlet embodying my present invention;

Fig. 1A is a sectional view of a T connector used on the hose;

Fig. 2 is a plan view thereof;

Fig. 3 is an enlarged side elevation to show further details over Fig. 1;

Fig. 4 is a vertical sectional view on the line 4—4 of Fig. 3;

Fig. 5 is an enlargement of a portion of Fig. 4 shown within an indicating circle thereof;

Fig. 6 is a vertical sectional view on the line 6—6 of Fig. 3;

Fig. 7 is an enlargement of that part of Fig. 6 within the indicating circle thereof; and Fig. 8 is a partial plan view similar to Fig. 2 showing a modified construction.

On the accompanying drawings I have used the reference character R to indicate in general a reel and P, a pulley. A supply hose 10 and a cable 12 are wound on the reel and their outer ends are connected together at a T-connector 14 from which depends an outlet hose 16, the cable extending from the reel R and around the pulley P and back to the connector as shown in Figs. 1 and 2. The connector 14 connects the hose 10 to the outlet hose 16 for flow of the material from one to the other.

The reel R comprises reel ends 18 (see Fig. 4) and a drum 20 with a divider flange 22 around the drum for dividing the drum into a hose reel section at the right of the divider 22 and a cable reel section at the left thereof. The reel R is supported by a pair of frame ends 24 and a frame top 26 which frame in turn is supported from a pair of angles 28 and a mounting bracket 30. The bracket may be secured to a ceiling 48 as shown in Fig. 1.

The manner of support between the frame 24—26 and the reel R is in the form of a reel shaft 32 which is preferably tubular, being plugged at one end as indicated at 31 and having a supply pipe 33 entering the other end thereof. The plug 31 may be inserted in the opposite end when the particular installation of 32 being made dictates connecting the supply pipe 33 to the end opposite that shown in Fig. 4. The reel shaft 32 is supported in notches 35 (see Fig. 3) of the frame ends 24 by means of lock nuts 34 as shown in Fig. 4. Bearings 36 are secured in the reel ends 18 and rotate on the reel shaft 32, there being a sealed rotary connection 38 between one of the reel ends 18 and the adjacent frame end 24. A coupling 40 is screwed into the connection 38 and the inner end of the hose 10 is connected therewith and extends therefrom over hose clips 42 as shown in Fig. 3 before passing through a hole 44 in the drum 20 (see Fig. 4) and then being wound on the drum.

A bracket 46 is provided for the pulley P and it likewise is secured to the ceiling 48 as shown in Fig. 1. A guide pulley 50 is provided for the hose 10 and is shown in Fig. 6 as mounted on a threaded shaft 52. A roller 54 is provided to retain the hose in the groove of the pulley and may be journalled in respect to the frame ends 24 by bearings 56 on a rod 53 as shown in Fig. 7. The pulley 50, being threaded on the shaft 52, will traverse the length of the shaft as the hose rotates the pulley and thus the hose is wound properly on the reel R, the pitch of the threads on the shaft 52 being correlated to the pitch of the hose as it is wound on the reel and the ratio being substantially the same as the relative hose pitch diameters of the reel and the pulley. In some installations, however, it is unnecessary to thread the shaft 52 (depending on the material being handled in the hose, stiffness of the hose etc.) in which case the pulley 50 may traverse a smooth shaft 52a as shown in the modification illustrated in Fig. 8.

The inner end of the cable 12 is secured to a cable connector 58 on the drum 20 as shown in Fig. 6 and is wound on an annular filler 60 to the left of the divider flange 22 as shown in Fig. 4 in a direction opposite that of the hose. The filler 60 is of suitable size to bring the pitch diameter of the cable to substantially the same pitch diameter as the hose but preferably a little greater pitch diameter so as to compensate for stretch in the hose whereas the cable which is preferably formed of steel wire or the like has substantially no stretch during operation. Thus, as the length of the hose extended from the reel is increased and stretches due to gravity acting thereon, the cable exerts greater pull on the connector 14 to keep the hose substantially taut.

If desired, the stretch of the hose can be counteracted by a cable 62 therein as shown in Figs. 1A and 4 which may have one end anchored in the T connector 14 as by an anchor disc 64 and an enlargement 66 on the cable 62 such as a cable clamp or the like. The other end of the cable would be anchored in a similar manner in the coupling 40 shown in Figs. 4 and 5. Fig. 1A also shows a screw eye 68 as the means of connection to the cable 12.

In operation, the hose may be utilized to supply lubricant, water or other liquids, compressed air or the like, to outlet nozzles or pneumatic tools and the like. The operator may, by means of the outlet hose 16, move the connector 14 either to the right or left without substantial resistance to such movement and the hose will be unwound as the cable is automatically rewound or vice versa. The reel may be made of suitable size to accommodate any desired distance between the reel and the pulley P and the connector 14 may traverse the entire distance between the two in a facile manner, thus making it convenient to perform such operations as lubricating bearings at different positions along the traversed path or use a pneumatic tool along such path at any point desired.

Some changes may be made in the construction and arrangement of the parts of my invention without departing from the real spirit and purpose thereof, and it is my intention to cover by my claims and modified forms of structure or use of mechanical equivalents which may be reasonably included within their scope.

I claim as my invention:

1. In a hose reel with traversing outlet, a rotatable reel, a hose having its inner end connected with said reel and wound thereon, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

2. In a hose reel with traversing outlet, a rotatable reel, a hose having its inner end connected with said reel and wound thereon, means to supply material to the center of said reel, a rotatable sealed connection surrounding said center for conducting the material from said means to said hose, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

3. In a hose reel with traversing outlet, a rotatable reel, a hose having its inner end connected with said reel and wound thereon, a pulley adjacent said reel over which said hose passes, an elongated shaft on which said pulley is journalled, said shaft being threaded and said pulley coacting with the threads thereof to guide said hose onto said hose reel, a roller parallel to said shaft and adjacent said pulley to keep said hose in the groove of the pulley, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

4. In a hose reel with traversing outlet, a rotatable reel, a hose having its inner end connected with said reel and wound thereon, a pulley adjacent said reel over which said hose passes, an elongated shaft on which said pulley is journalled, a roller parallel to said shaft and adjacent said pulley to keep said hose in the groove of the pulley, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

5. In a hose reel with traversing outlet, a rotatable reel, a hose having its inner end connected with said reel and wound thereon, a pulley adjacent said reel over which said hose passes, an elongated shaft on which said pulley is journalled, said shaft being threaded and said pulley coacting with the threads thereof to guide said hose onto said hose reel, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

6. In a hose reel with traversing outlet, a rotatable reel, a hose having its inner end connected with said reel and wound thereon, a pulley adjacent said reel over which said hose passes, an elongated shaft on which said pulley is journalled, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

7. In a hose reel with traversing outlet, a rotatable reel, a hose having its inner end connected with said reel and wound thereon, means for supplying material to the center of said reel, a rotatable sealed connection surrounding said center for conducting the material from said means to said hose, a pulley adjacent said reel over which said hose passes, an elongated shaft on which said pulley is journalled, said shaft being threaded and said pulley coacting with the threads thereof to guide said hose onto said hose reel, a roller parallel to said shaft and adjacent said pulley to keep said hose in the groove of the pulley, a cable having its inner end connected with said reel and wound thereon in the opposite direction, a pulley remote from said reel, said cable extending from said reel to and around said pulley and back toward said reel, the outer end of said hose being connected with the returning end of said cable, and an outlet at said outer end of said hose for utilization of material supplied by said hose.

8. In a structure of a class described, a rotatable hose drum and a rotatable cable drum mounted side by side and operatively connected together for simultaneous rotation, a hose having its inner end connected with said hose drum and wound thereon, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, and an outlet at said outer end of said hose for utilization of material supplied by said hose, said structure permitting positioning of said outlet at any point between said drums and said pulley.

9. In a structure of a class described, a rotatable hose drum and a rotatable cable drum mounted side by side and operatively connected together for simultaneous rotation, a hose having its inner end connected with said hose drum and wound thereon, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, an outlet at said outer end of said hose for utilization of material supplied by said hose, said structure permitting positioning of said outlet at any point between said drums and said pulley, the diameter of said cable drum being greater than the diameter of said hose drum by an amount substantially equal to the difference between the diameters of said hose and said cable to maintain substantially equal tension on said hose in all positions of adjustment thereof.

10. In a structure of a class described, a rotatable hose drum and a rotatable cable drum mounted side by side and operatively connected together for simultaneous rotation, a hose having its inner end connected with said hose drum and wound thereon, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, an outlet at said outer end of said hose for utilization of material supplied by said hose, said structure permitting positioning of said outlet at any point between said drums and said pulley, the diameter of said cable drum being greater than the diameter of said hose drum by a small amount in excess of the difference between the diameters of said hose and said cable to compensate for stretch in said hose.

11. In a structure of a class described, a rotatable hose drum and a rotatable cable drum mounted side by side and operatively connected together for simultaneous rotation, a hose having its inner end connected with said hose drum and wound thereon, means to supply material to the center of said drum, a rotatable sealed connection surrounding said center for conducting the material from said means to said hose, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, and an outlet at said outer end of said hose for utilization of material supplied by said hose.

12. In a structure of a class described, a rotatable hose drum and a rotatable cable drum mounted side by side and operatively connected together for simultaneous rotation, a hose having its inner end connected with said hose drum and wound thereon, a pulley adjacent said hose drum over which said hose passes, an elongated shaft on which said pulley is journalled, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, and an outlet at said outer end of said hose for utilization of material supplied by said hose.

13. In a structure of a class described, a rotatable hose drum and a rotatable cable drum mounted side by side and operatively connected together for simultaneous rotation, a hose having its inner end connected with said hose drum and wound thereon, a pulley adjacent said hose drum over which said hose passes, an elongated shaft on which said pulley is journalled, said shaft being threaded and said pulley coacting with the threads thereof to guide said hose onto said hose drum, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, and an oulet at said outer end of said hose for utilization of material supplied by said hose, said structure permitting positioning of said outlet at any point between said drums and said pulley.

14. In a structure of a class described, a rotatable hose drum and a rotatable cable drum mounted side by side and operatively connected together for simultaneous rotation, a hose having its inner end connected with said hose drum and wound thereon, a pulley adjacent said hose drum over which said hose passes, an elongated shaft on which said pulley is journalled, said shaft being threaded and said pulley coacting with the threads thereof to guide said hose onto said hose drum, a roller parallel to said shaft and adjacent said pulley to keep said hose in the groove of the pulley, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, and an outlet at said outer end of said hose for utilization of material supplied by said hose, said structure permitting positioning of said outlet at any point between said drums and said pulley.

15. In a structure of a class described, a rotatable hose drum and a rotatable cable drum mounted side by side and operatively connected together for simultaneous rotation, a hose having its inner end connected with said hose drum and wound thereon, means for supplying material to the center of said drum, a rotatable sealed connection surrounding said center for conducting the material from said means to said hose, a pulley adjacent said hose drum over which said hose passes, an elongated shaft on which said pulley is journalled, a cable having its inner end connected with said cable drum and wound thereon in the opposite direction, a pulley removed from said drums, said cable extending from said cable drum to and around said pulley and having its outer end extending back toward said hose drum, the outer end of said hose being connected with said outer end of said cable, and an outlet at said outer end of said hose for utilization of material supplied by said hose, said structure permitting positioning of said outlet at any point between said drums and said pulley.

16. In a hose reel with traversing outlet, a rotatable reel, a hose having its inner end connected with said reel and wound thereon, a cable having its inner end connected with said reel and wound thereon in the opposite direction, a pulley remote from said reel, said cable extending from said reel to and around said pulley and back toward said reel, the outer end of said hose being connected with the returning end of said cable a second cable inside said hose and having its ends anchored to said reel and said outer end of said hose, and an outlet at said outer end of said hose for utilization of material supplied by said hose.

No references cited.